(12) United States Patent
Lee et al.

(10) Patent No.: US 11,837,406 B2
(45) Date of Patent: Dec. 5, 2023

(54) MULTILAYER ELECTRONIC COMPONENT

(71) Applicant: SAMSUNG ELECTRO-MECHANICS CO., LTD., Suwon-si (KR)

(72) Inventors: Eung Seok Lee, Suwon-si (KR); Tae Gyun Kwon, Suwon-si (KR); Yun Sung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/830,946

(22) Filed: Jun. 2, 2022

(65) Prior Publication Data
US 2023/0245821 A1 Aug. 3, 2023

(30) Foreign Application Priority Data
Feb. 3, 2022 (KR) .......................... 10-2022-0013951

(51) Int. Cl.
*H01G 4/008* (2006.01)
*H01G 4/30* (2006.01)
*H01G 4/12* (2006.01)

(52) U.S. Cl.
CPC .......... *H01G 4/0085* (2013.01); *H01G 4/1209* (2013.01); *H01G 4/30* (2013.01); *H01G 4/306* (2013.01)

(58) Field of Classification Search
None
See application file for complete search history.

(56) References Cited

U.S. PATENT DOCUMENTS

| | | | | |
|---|---|---|---|---|
| 5,097,391 A | * | 3/1992 | Nomura | H01G 4/1281 29/25.42 |
| 6,442,813 B1 | * | 9/2002 | Sakamoto | H01G 4/30 29/25.42 |
| 7,847,328 B2 | * | 12/2010 | Kiyomura | H01G 4/33 257/532 |
| 2003/0041427 A1 | | 3/2003 | Hattori | |
| 2011/0149466 A1 | * | 6/2011 | Hwang | H01G 4/30 361/303 |
| 2013/0063862 A1 | * | 3/2013 | Kim | H01G 4/30 156/182 |
| 2014/0175942 A1 | * | 6/2014 | Banno | H10N 30/50 336/200 |
| 2015/0318109 A1 | * | 11/2015 | Lee | H01G 4/0085 156/89.16 |

(Continued)

FOREIGN PATENT DOCUMENTS

| CN | 102103927 A | * | 6/2011 | ............. H01G 4/012 |
|---|---|---|---|---|
| JP | H03208323 A | * | 9/1991 | |

(Continued)

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a plurality of internal electrodes and a dielectric layer disposed between the plurality of internal electrodes; and an external electrode disposed on the body and connected to the plurality of internal electrodes, wherein each of the plurality of internal electrodes includes a plurality of nickel layers, and a heterogeneous material layer provided between the plurality of nickel layers.

19 Claims, 3 Drawing Sheets

(56) References Cited

U.S. PATENT DOCUMENTS

| | | | | |
|---|---|---|---|---|
| 2022/0223344 A1* | 7/2022 | Jung | ................ | H01G 4/012 |
| 2022/0238634 A1* | 7/2022 | Na | ................ | H10N 70/231 |
| 2022/0384109 A1* | 12/2022 | Masuda | ................ | H01G 4/30 |

FOREIGN PATENT DOCUMENTS

| | | | | | | |
|---|---|---|---|---|---|---|
| JP | 2005223313 | A | * | 8/2005 | ............. | H01G 4/12 |
| JP | 3785966 | B2 | | 6/2006 | | |
| JP | 2014093517 | A | * | 5/2014 | ............. | H01G 4/008 |
| JP | 5641139 | B2 | | 12/2014 | | |
| JP | 6919565 | B2 | * | 8/2021 | ............. | H01L 33/32 |
| KR | 980012418 | A | * | 4/1998 | | |
| WO | WO-2016038856 | A1 | * | 3/2016 | ............. | H01L 33/32 |

\* cited by examiner

MULTILAYER ELECTRONIC COMPONENT

CROSS-REFERENCE TO RELATED APPLICATION(S)

This application claims benefit of priority to Korean Patent Application No. 10-2022-0013951 filed on Feb. 3, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor, a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such a multilayer ceramic capacitor may be used as a component of various electronic devices due to its relatively small size, relatively high capacity, and relative ease of mounting. As sizes of the components of electronic devices decrease, demand for decreasing the size and increasing the capacity of multilayer ceramic capacitors is increasing.

According to this trend, the size of the multilayer ceramic capacitor is gradually decreasing, and the effective volume ratio of the dielectric in the same volume is increasing in order to realize high capacity at a small scale, and the thickness of the electrode is getting thinner.

Here, among the components of the multilayer ceramic capacitor, a screen-printing process and a gravure printing process are representative of a process of forming an internal electrode. However, in the screen-printing process and the gravure printing process, since the use of a paste containing conductive metal particles is essential, there may be a technical limitation to thinning the internal electrode using these processes.

SUMMARY

An aspect of the present disclosure is to provide a multilayer electronic component in which miniaturization and high capacity are realized by providing an ultra-thin internal electrode.

In addition, another aspect of the present disclosure is to provide a multilayer electronic component having improved performance by providing an internal electrode including various functional materials to secure electrical/physical properties, connectivity, and special functions.

However, the aspects of the present disclosure are not limited to the above, and will be more easily understood in the process of describing specific embodiments of the present disclosure.

According to an aspect of the present disclosure, a multilayer electronic component includes a body including a plurality of internal electrodes and a dielectric layer disposed between the plurality of internal electrodes; and an external electrode disposed on the body and connected to the plurality of internal electrodes, wherein each of the plurality of internal electrodes includes a plurality of nickel layers, and a heterogeneous material layer disposed between the plurality of nickel layers.

According to another aspect of the present disclosure, a method for forming a multilayer electronic component body includes performing vacuum deposition to form: (i) a first layer including nickel, (ii) a layer including a heterogeneous material on the first layer, and (iii) a second layer including nickel on the layer including the heterogeneous material.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
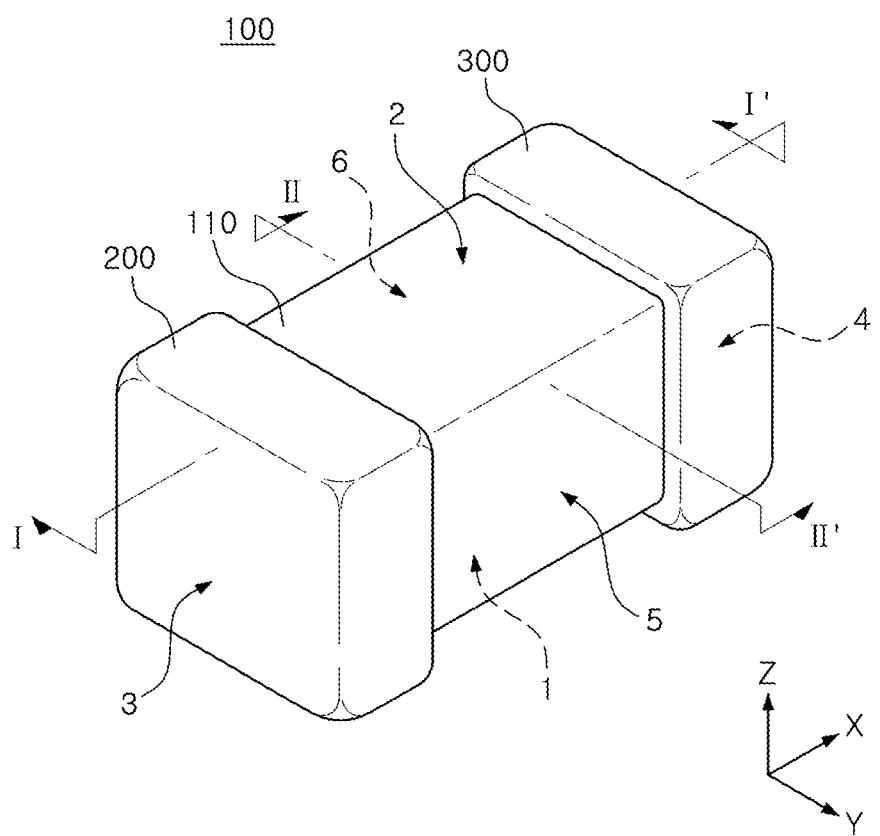
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, an X direction may be defined as a first direction or a length direction, a Y direction may be defined as a second direction or a width direction, and a Z direction may be defined as a third direction, a thickness direction, or a stacking direction.

Multilayer Electronic Component

FIG. 1 is a perspective view schematically illustrating a multilayer electronic component according to an embodiment of the present disclosure.

Figure 2:
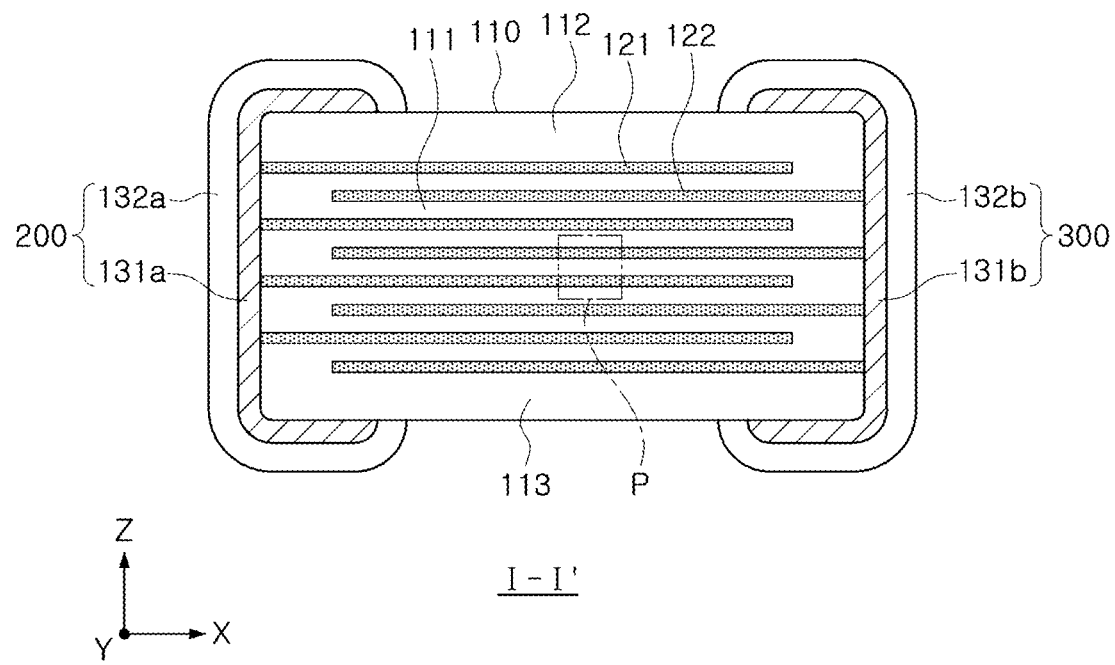
FIG. 2 is a cross-sectional view of FIG. 1, taken along line I-I'.

FIG. 2 is a cross-sectional view of FIG. 1, taken along line I-I'.

Figure 3:
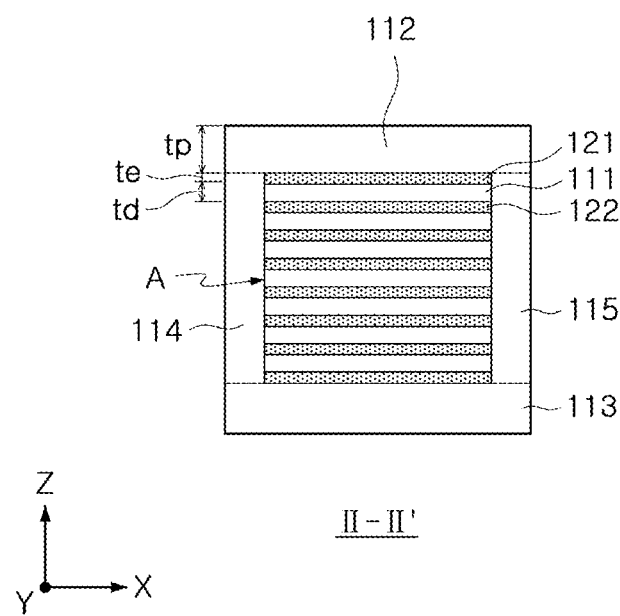
FIG. 3 is a cross-sectional view of FIG. 1, taken along line II-II'.

FIG. 3 is a cross-sectional view of FIG. 1, taken along line II-II'.

Figure 4:
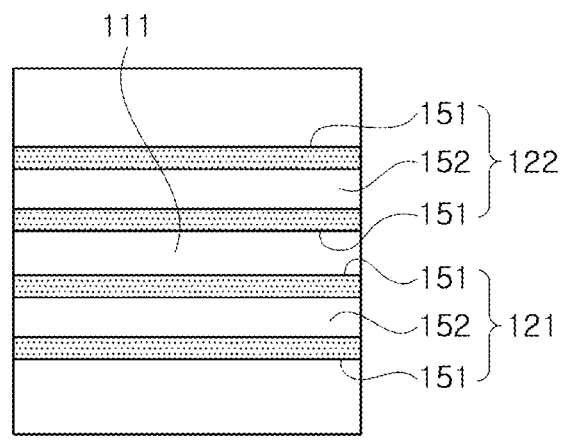
FIG. 4 is an enlarged view schematically illustrating portion 'P' of FIG. 2.

FIG. 4 is an enlarged view schematically illustrating portion 'P' of FIG. 2.

Figure 5:
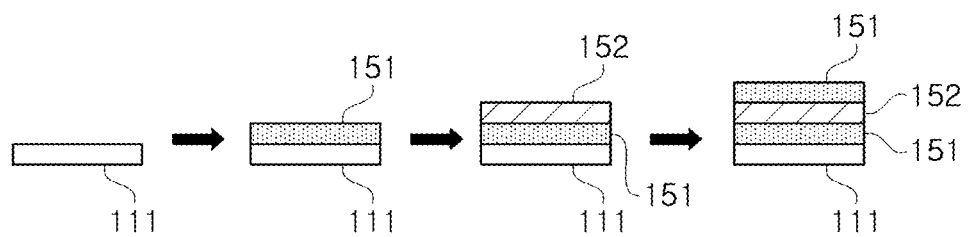
FIG. 5 schematically illustrates a process of stacking a nickel layer and a heterogeneous material layer using a vacuum deposition process for manufacturing an internal electrode of a multilayer electronic component according to an embodiment of the present disclosure.

FIG. 5 schematically illustrates a process of stacking a nickel layer and a heterogeneous material layer using a vacuum deposition process for manufacturing an internal electrode of a multilayer electronic component according to an embodiment of the present disclosure.

Hereinafter, a multilayer electronic component according to an embodiment of the present disclosure will be described in detail with reference to FIGS. 1 to 5.

A multilayer electronic component 100 according to an embodiment of the present disclosure may include a body 110 including a plurality of internal electrodes 121 and 122 and a dielectric layer 111 disposed between the plurality of internal electrodes; and an external electrode (200 or 300) disposed on the body and connected to the plurality of internal electrodes.

The body 110 may include a plurality of internal electrodes 121 and 122 and a dielectric layer 111 disposed between the plurality of internal electrodes. In the body, the dielectric layer 111 and the internal electrodes 121 and 122 may be alternately stacked.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may have first and second surfaces 1 and 2 opposing each other in the thickness direction (the Z direction), third and fourth surfaces 3 and 4 connected to the first and second surfaces 1 and 2 and opposing each other in the length direction (the X direction), and fifth and sixth surfaces 5 and 6 connected to the first and second surfaces 1 and 2, connected to the third and fourth surfaces 3 and 4, and opposing each other in the width direction (the Y direction).

A plurality of dielectric layers 111 forming the body 110 may be in a sintered state, and a boundary between adjacent dielectric layers 111 may be integrated to such an extent that it is difficult to identify the device without using a scanning electron microscope (SEM).

A raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved in $BaTiO_3$, or the like.

In addition, various ceramic additives, organic solvents, plasticizers, binders, dispersants, or the like may be added to the powder of barium titanate ($BaTiO_3$), and the like, as the material for forming the dielectric layer 111.

The internal electrodes 121 and 122 may be alternately disposed with the dielectric layer 111 in the thickness direction (the Z direction). The internal electrodes may include a first internal electrode 121 and a second internal electrode 122. The first and second internal electrodes 121 and 122 may be alternately disposed to oppose each other with the dielectric layer 111, constituting the body 110, interposed therebetween, and may be exposed from the third and fourth surfaces 3 and 4 of the body 110, respectively.

Referring to FIG. 2, the first internal electrode 121 may be spaced apart from the fourth surface 4 and may be exposed from the third surface 3, and the second internal electrode 122 may be spaced apart from the third surface 3 and may be exposed from the fourth surface 4.

For example, the first and second internal electrodes 121 and 122 may be alternately exposed from the third surface 3 and the fourth surface 4, both end surfaces in the length direction (the X direction) of the body, respectively, to reach to first and second external electrodes 200 and 300, respectively. The first internal electrode 121 may not be connected to the second external electrode 300, but may be connected to the first external electrode 200. Also, the second internal electrode 122 may not be connected to the first external electrode 200, but may be connected to the second external electrode 300. Therefore, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may include a capacitance formation portion A disposed in the body 110 and including the first and second internal electrodes 121 and 122 disposed to oppose each other with the dielectric layer 111 interposed therebetween to form capacitance, and cover portions 112 and 113 formed above and below the capacitance formation portion A.

In addition, the capacitance formation portion A may be a portion contributing to capacitance formation of a capacitor, and may be formed by repeatedly stacking the plurality of first and second internal electrode layers 121 and 122 with the dielectric layer 111 interposed therebetween.

An upper cover portion 112 and a lower cover portion 113 may be formed by stacking the single dielectric layer or the two or more dielectric layers on upper and lower surfaces of the capacitance formation portion A, respectively, in the thickness direction, and may basically play a role in preventing damage to the internal electrodes due to physical or chemical stress.

The upper cover portion 112 and the lower cover portion 113 may not include internal electrodes, and may include the same material as the dielectric layer 111.

For example, the upper cover portion 112 and the lower cover portion 113 may include a ceramic material, for example, a barium titanate ($BaTiO_3$)-based ceramic material.

Thicknesses of the cover portions 112 and 113 are not particularly limited. To more easily achieve miniaturization and high capacity of the multilayer electronic component, a thickness tp of each of the cover portions 112 and 113 may be 20 μm or less.

In addition, margin portions 114 and 115 may be disposed on lateral surfaces of the capacitance formation portion A.

The margin portions 114 and 115 may include a margin portion 114 disposed on the sixth surface 6 of the body 110 and a margin portion 115 disposed on the fifth surface 5 of the body 110. For example, the margin portions 114 and 115 may be disposed on both lateral surfaces of the ceramic body 110 in the width direction (the Y direction).

As illustrated in FIG. 3, the margin portions 114 and 115 may refer to regions between both ends of the first and second internal electrodes 121 and 122, and an external surface of the body 110, in a cross-section of the body 110 cut in a width-thickness (WT) direction.

The margin portions 114 and 115 may basically play a role in preventing damage to the internal electrodes due to physical or chemical stress.

The margin portions 114 and 115 may be prepared by forming the internal electrodes on a ceramic green sheet by a vacuum deposition process, which will be described later, except for a portion in which the margin portions are formed.

Alternatively, to suppress a step difference caused by the internal electrodes 121 and 122, after stacking, the internal electrodes may be cut to be exposed from the fifth and sixth surfaces 5 and 6 of the body 110, and then a single dielectric layer or two dielectric layers may be stacked on both lateral surfaces of the capacitance formation portion A in the width direction, to form margin portions 114 and 115.

The external electrode (200 or 300) may be disposed on the body 110, and may be connected to the internal electrodes 121 and 122.

As illustrated in FIG. 2, the external electrodes 200 and 300 may be disposed on the third and fourth surfaces 3 and 4 of the body 110, respectively, and may include first and second external electrodes 200 and 300 respectively connected to the first and second internal electrodes 121 and 122.

Although a structure in which the multilayer electronic component 100 has two external electrodes 200 and 300 is described in the present embodiment, the number, a shape, or the like of the external electrodes 200 and 300 may be changed, depending on a shape of the internal electrodes 121 and 122 or other purposes.

The external electrodes 200 and 300 may be formed using various materials having electrical conductivity such as metal or the like, and a specific material may be determined in consideration of electrical characteristics, structural stability, or the like, and furthermore, may have a multilayer structure.

For example, the external electrodes 200 and 300 may include electrode layers 131a and 131b disposed on the body 110 and plating layers 132a and 132b formed on the electrode layers. For example, the electrode layers 131a and 131b may include conductive metal and glass, and may be, specifically, a sintered electrode including conductive metal and glass, or a resin-based electrode including conductive metal and resin.

Alternatively, the electrode layers 131a and 131b may have a form in which a sintered electrode and a resin-based electrode are sequentially formed on a body. In addition, the electrode layers 131a and 131b may be formed by transferring a sheet including conductive metal onto the body or by transferring a sheet including conductive metal onto the sintered electrode.

As the conductive metal included in the electrode layers 131a and 131b, a material having excellent electrical conductivity may be used, and the material is not particularly limited thereto. For example, the conductive metal may be at least one of nickel (Ni), copper (Cu), or alloys thereof.

The plating layers 132a and 132b serve to improve mounting characteristics. Types of the plating layers 132a and 132b are not particularly limited, and may be a plating layer including at least one of Ni, Sn, Pd, or alloys thereof, and may be formed as a plurality of layers.

As a more specific example of the plating layers 132a and 132b, the plating layers 132a and 132b may be an Ni plating layer or an Sn plating layer, and in particular, an Sn plating layer. Alternatively, the plating layers 132a and 132b may have a form in which the Ni plating layer and the Sn plating layer are sequentially formed on the electrode layer, and the Sn plating layer, the Ni plating layer, and the Sn plating layer are sequentially formed. In addition, the plating layers 132a and 132b may include a plurality of Ni plating layers and/or a plurality of Sn plating layers.

Conventionally, when manufacturing an internal electrode of a multilayer ceramic capacitor, a screen-printing process or a gravure printing process may be applied. In such a screen-printing process and a gravure printing process, since use of a paste containing conductive metal particles is essential, there may be a technical limitation to thinning. In such a screen-printing process and a gravure printing process, an intaglio engraving plate for printing a desired printing pattern and shape may be used. For this reason, the screen-printing process and the gravure printing process may be widely used not only in electronic devices, but also in other industrial fields because mass production is easy.

Due to characteristics of the engraving printing, there may be limitations to the screen-printing process and the gravure printing process for ultra-small and precise printing. In addition to the above problems, the screen-printing process and the gravure printing process have limited use of a functional material in the internal electrode due to use of an organic composite material included in the paste.

To realize high integration and miniaturization of the next-generation multilayer ceramic capacitor, it is essential to implement an internal electrode of a thin film having a thickness of 200 nm or less. Therefore, in the present disclosure, it is possible to replace the screen-printing process and the gravure printing process, and to achieve the above object using a vacuum sputtering process that may implement a thin-film internal electrode.

For example, as a result of repeated research by the present inventors, the internal electrodes 121 and 122 of the multilayer ceramic capacitor were implemented to form a multilayer structure using a vacuum deposition process. Specifically, in the present disclosure, in order to solve the problems of the prior art, disadvantages of the direct printing process may be solved using a deposition process to configure an internal electrode having a multilayer structure to perform each function to take on the role of each layer. It is possible to overcome this and realize a next-generation multilayer ceramic capacitor. Therefore, it is possible not only to design a structure of the internal electrode, which may not be feasible in the conventional direct printing process, but also to improve the properties due to non-use of nickel powder or organic material among the paste materials.

Specifically, in the present disclosure, the aforementioned internal electrodes 121 and 122 may include a plurality of nickel layers 151, and a heterogeneous material layer 152 provided between the plurality of nickel layers. According to the present disclosure, it is possible to improve properties by implementing an internal electrode thinning a thickness thereof and including a functional material at the same time. In some embodiments, the body may include the dielectric layer 111, a first nickel layer 151, a heterogeneous material layer 152, and a second nickel layer 151, in order.

An internal electrode having such a multilayer structure is specifically illustrated in FIG. 4. First, the internal electrodes 121 and 122 include a plurality of nickel layers 151 exhibiting conductivity, and the nickel layers included in one internal electrode of the internal electrodes 121 and 122 may be provided as a plurality of nickel layers, such as two or more nickel layers. Alternatively, the nickel layers included in one internal electrode may be provided as two nickel layers. As such, a case in which two nickel layers are present in one internal electrode is illustrated in FIG. 4, a heterogeneous material layer 152 interposed therebetween, two nickel layers may be stacked above and below the heterogeneous material layer, respectively, in the thickness direction (the Z direction), with the heterogeneous material layer 152 interposed therebetween.

According to an embodiment of the present disclosure, the nickel layer 151 may include nickel as a main component, or may include 95 wt % or more of nickel. In this case, the nickel layer may be formed in a vacuum deposition process (a sputtering process) using nickel as a material.

According to an embodiment of the present disclosure, an average thickness of the nickel layer may be 10 to 100 nm. According to the present disclosure, since the internal electrode may be formed in a vacuum deposition process, a thin heterogeneous material layer may be formed. Therefore, miniaturization and integration of the multilayer ceramic capacitor may be realized. When an average thickness of the nickel layer is less than 10 nm, a problem in connectivity of the electrode may occur. When an average thickness of the nickel layer exceeds 100 nm, there may be problems in that the number of effective electrode layers per unit volume may be limited and a decrease in capacity may occur.

In this case, a method of measuring the average thickness of the nickel layer is not specifically limited. As an example, one nickel layer 151 in any one of the internal electrodes in which cross-sections in the X and Z direction (the length and thickness directions), cut from a central portion of the body 110 in the Y direction (the width direction), are extracted from images scanned with a scanning electron microscope (SEM), may be determined by measuring each thickness of the nickel layer at ten (10) equally spaced points in the length direction, and then calculating an average value thereof.

In addition, according to an embodiment of the present disclosure, the heterogeneous material layer may be at least one selected from the group consisting of a heterogeneous metal layer, a functional ceramic layer, and a thermal barrier functional material layer. Therefore, the heterogeneous material layer may be a heterogeneous metal layer, may be a functional ceramic layer, may be a thermal barrier functional material layer, or may be provided as multiple layers in which a heterogeneous metal layer, a functional ceramic layer, and a thermal barrier functional material layer are stacked. In the present disclosure, a functional layer such as the above-described heterogeneous material layer may be added into the internal electrode, to improve performance of the multilayer ceramic capacitor in a desired direction.

According to an embodiment of the present disclosure, the plurality of internal electrodes 121 and 122 may be formed in a vacuum deposition process (a sputtering process). Therefore, the plurality of nickel layers and the heterogeneous metal layer, described above, may be formed in a vacuum deposition process (a sputtering process). In this manner, the internal electrodes of the multilayer ceramic capacitor may be formed in a vacuum deposition process, to implement internal electrodes having an ultra-thin layer of 10 nm level, as well as to implement internal electrodes by including several functional materials at the same time, compared to those using a direct printing process, or to implement an internal electrode having a multilayer structure.

FIG. 5 schematically illustrates a process of manufacturing a multilayer electronic component according to an embodiment of the present disclosure. As illustrated in FIG. 5, after forming a dielectric layer 111 by a slot die coating process, in order to stack internal electrodes 121 and 122 on the dielectric layer 111, a nickel layer 151 may be formed directly on the dielectric layer 111 using a vacuum deposition process, described above. Next, after forming a heterogeneous material layer 152 directly on the nickel layer 151 using a vacuum deposition process similarly, an additional nickel layer 151 may be formed directly on the heterogeneous material layer 151 by a vacuum deposition process. The processes may be repeatedly performed to form a body 110 of a multilayer electronic component, as in the present disclosure.

According to an embodiment of the present disclosure, when the heterogeneous material layer is a heterogeneous metal layer, the heterogeneous metal layer may include metal, different from nickel. Specifically, the heterogeneous metal layer may include at least one metal selected from the group consisting of aluminum (Al), tantalum (Ta), and platinum (Pt). As such, another type of metal, other than nickel (Ni), as a material of the internal electrode, may be applied to improve electrical and physical properties such as conductivity, interlayer adhesion, or the like.

Alternatively, according to an embodiment of the present disclosure, when the heterogeneous material layer is a functional ceramic layer, the functional ceramic layer may include one or more types of ceramics selected from the group consisting of indium tin oxide (ITO), fluorine-doped tin oxide (FTO), and strontium ruthenium oxide (SRO). As such, the ceramic material as a material of the internal electrode may be applied to alleviate a shrinkage rate between the internal electrode and the dielectric layer and improve connectivity of the internal electrode.

Alternatively, according to an embodiment of the present disclosure, when the heterogeneous material layer is a thermal barrier functional material layer, the thermal barrier functional material layer may use yttria stabilized zirconia (YSZ), for example, a special material such as yttria stabilized zirconia or the like.

According to an embodiment of the present disclosure, an average thickness of the heterogeneous material layer may be 10 to 100 nm. According to the present disclosure, since the internal electrode may be formed in a vacuum deposition process, a thin heterogeneous material layer may be formed. Therefore, miniaturization and integration of the multilayer ceramic capacitor may be realized. When an average thickness of the heterogeneous material layer is less than 10 nm, a problem in securing a desired function may occur. When an average thickness of the heterogeneous material layer exceeds 100 nm, there may be problems in that the number of effective electrode layers per unit volume may be limited and a decrease in capacity may occur.

In this case, a method of measuring the average thickness of the heterogeneous material layer is not specifically limited. As an example, one heterogeneous material layer 152 in any one of the internal electrodes in which cross-sections in the X and Z direction (the length and thickness directions), cut from a central portion of the body 110 in the Y direction (the width direction), are extracted from images scanned with a scanning electron microscope (SEM), may be determined by measuring each thickness of the heterogeneous material layer at ten (10) equally spaced points in the length direction, and then calculating an average value thereof.

In addition, according to an embodiment of the present disclosure, an average thickness to of the internal electrodes 121 and 122 may be 10 to 300 nm, or 30 to 300 nm. According to the present disclosure, since the internal electrode may be formed in a vacuum deposition process, it is possible to form a thin internal electrode having a thickness of 100 nm or less. Therefore, miniaturization and integration of the multilayer ceramic capacitor may be realized. When an average thickness of the internal electrode is less than 10 nm, a problem in terms of connectivity of the electrode may occur. When an average thickness of the internal electrode exceeds 300 nm, there may be problems in that the number of effective electrode layers per unit volume may be limited and a decrease in capacity may occur.

In this case, the average thickness of the internal electrode refers to an average value of thicknesses of one internal electrode, and thus an average value of a total of thicknesses of the plurality of nickel layers and thicknesses of the heterogeneous material layers present in the one internal electrode.

A method for measuring the average thickness to of the internal electrode is not particularly limited. As an example, as in measuring the average thickness of the nickel layer and the heterogeneous material layer, one internal electrode in which cross-sections in the X and Z direction (the length and thickness directions), cut from a central portion of the body 110 in the Y direction (the width direction), are extracted from images scanned with a scanning electron microscope (SEM), may be determined by measuring each thickness of the internal electrode at ten (10) equally spaced points in the length direction, and then calculating an average value thereof.

According to an embodiment of the present disclosure, for one internal electrode, a ratio (W2/W1) of a thickness (W2) of the heterogeneous material layer to a thickness (W1) of the plurality of nickel layers may be 0.1 to 1. When the ratio (W2/W1) is less than 0.1, there may be a problem in an original role such as delay of contraction or the like. When the ratio (W2/W1) exceeds 1, there may be a problem of degradation in performance of the MLCC due to diffusion of heterogeneous materials.

In this case, in a similar manner to the aforementioned method, in determining W1 and W2, one internal electrode in which cross-sections in the X and Z direction (the length and thickness directions), cut from a central portion of the body 110 in the Y direction (the width direction), are extracted from images scanned with a scanning electron microscope (SEM), may be determined by measuring thicknesses of the plurality of nickel layers and thicknesses of the heterogeneous material layer at ten (10) equally spaced points in the length direction, and then calculating an average value of W2/W1.

There may be no need to particularly limit a size of the multilayer electronic component 100.

To achieve miniaturization and high capacity at the same time, it is necessary to increase the number of stacks by reducing thicknesses of the dielectric layer and the internal electrode. Therefore, the multilayer electronic component 100 having a size of 0402 (length×width, 0.4 mm×0.2 mm) or less, a reliability improvement effect according to the present disclosure may be more remarkable.

Therefore, in consideration of manufacturing errors, external electrode sizes, or the like, when a length of the multilayer electronic component 100 is 0.44 mm or less and a width thereof is 0.22 mm or less, a reliability improvement effect according to the present disclosure may be more remarkable. In this case, the length of the multilayer electronic component 100 refers to a maximum size of the multilayer electronic component 100 in the second direction, and the width of the multilayer electronic component 100 refers to a maximum size of the multilayer electronic component 100 in the third direction.

One of the various effects of the present disclosure is to provide a multilayer electronic component in which miniaturization and high capacity are realized by providing an ultra-thin internal electrode.

In addition, one of the various effects of the present disclosure is to provide a multilayer electronic component having improved performance by providing an internal electrode including various functional materials to secure electrical/physical properties, connectivity, and special functions.

However, various advantages and effects of the present disclosure are not limited to the above, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a plurality of internal electrodes and a dielectric layer disposed between the plurality of internal electrodes; and
an external electrode disposed on the body and connected to the plurality of internal electrodes,
wherein each of the plurality of internal electrodes includes a plurality of nickel layers, and an electrically conductive heterogeneous material layer disposed between the plurality of nickel layers.

2. The multilayer electronic component of claim 1, wherein the heterogeneous material layer is a heterogeneous metal layer.

3. The multilayer electronic component of claim 2, wherein the heterogeneous metal layer comprises a metal, different from nickel.

4. The multilayer electronic component of claim 3, wherein the heterogeneous metal layer comprises at least one metal selected from the group consisting of Al, Ta, and Pt.

5. The multilayer electronic component of claim 1, wherein the heterogeneous material layer is a functional ceramic layer.

6. The multilayer electronic component of claim 5, wherein the functional ceramic layer comprises at least one ceramic selected from the group consisting of indium tin oxide (ITO), fluorine-doped tin oxide (FTO), and strontium ruthenium oxide (SRO).

7. The multilayer electronic component of claim 1, wherein an average thickness of the plurality of internal electrodes is 10 to 300 nm.

8. The multilayer electronic component of claim 1, wherein an average thickness of the heterogeneous material layer is 10 to 100 nm.

9. The multilayer electronic component of claim 1, wherein an average thickness of the plurality of nickel layers is 10 to 100 nm.

10. The multilayer electronic component of claim 1, wherein a ratio (W2/W1) of a thickness (W2) of the heterogeneous material layer to a thickness (W1) of the plurality of nickel layers, in each of the plurality of internal electrodes, is 0.1 to 1.

11. The multilayer electronic component of claim 1, wherein the plurality of nickel layers included in each of the plurality of internal electrodes are two nickel layers.

12. The multilayer electronic component of claim 2, wherein the plurality of nickel layers and the heterogeneous metal layer are formed in a vacuum deposition process.

13. The multilayer electronic component of claim 11, wherein the body includes the dielectric layer, a first nickel layer, a heterogeneous material layer, and a second nickel layer, in order.

14. A method for forming a multilayer electronic component body comprising:
performing vacuum deposition to form: (i) a first layer including nickel, (ii) a layer including an electrically conductive heterogeneous material on the first layer, and (iii) a second layer including nickel on the layer including the heterogeneous material.

15. The method of claim 14, wherein the heterogeneous material includes at least one of a ceramic and a metal different from nickel.

16. The method of claim 15, wherein the metal comprises at least one metal selected from the group consisting of Al, Ta, and Pt.

17. The method of claim 15, wherein the ceramic comprises at least one ceramic selected from the group consisting of indium tin oxide (ITO), fluorine-doped tin oxide (FTO), and strontium ruthenium oxide (SRO).

18. A multilayer electronic component comprising:
a body including a plurality of internal electrodes and a dielectric layer disposed between the plurality of internal electrodes; and
an external electrode disposed on the body and connected to the plurality of internal electrodes,
wherein each of the plurality of internal electrodes includes a plurality of nickel layers, and a heterogeneous material layer disposed between the plurality of nickel layers, and
wherein the heterogeneous material layer is a thermal barrier functional material layer.

19. The multilayer electronic component of claim 18, wherein the heterogeneous material layer comprises yttria stabilized zirconia (YSZ).

* * * * *